C. A. KRAUSS.
BAIL FOR RECEPTACLES.
APPLICATION FILED SEPT. 11, 1919. RENEWED JULY 20, 1920.
1,368,508. Patented Feb. 15, 1921.
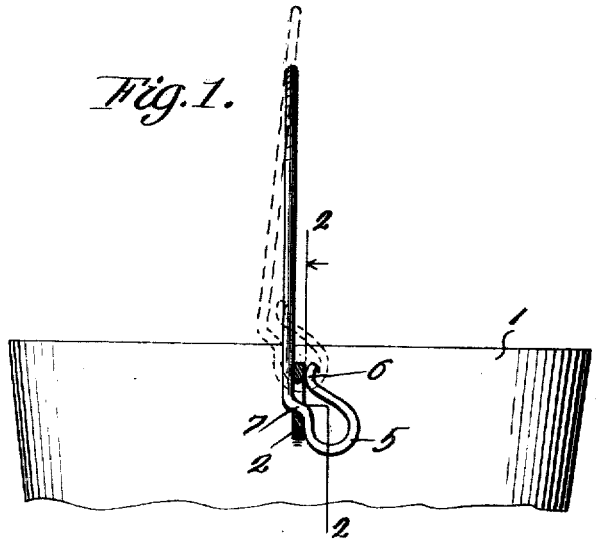
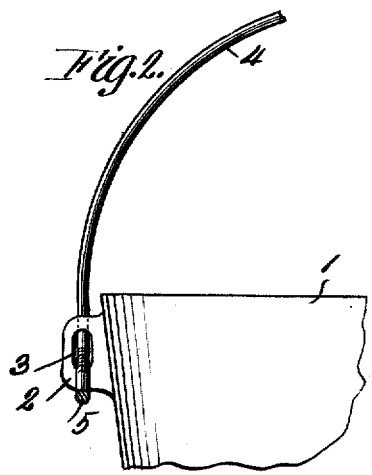
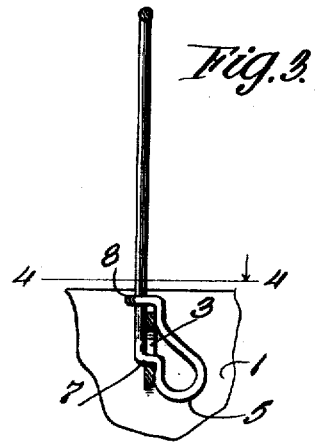
WITNESSES
Guy M. Spring
B. F. Garvey
Inventor
CHARLES A. KRAUSS
By Richard B. Owen
Attorney

UNITED STATES PATENT OFFICE.

CHARLES A. KRAUSS, OF PHILADELPHIA, PENNSYLVANIA.

BAIL FOR RECEPTACLES.

1,368,508.      Specification of Letters Patent.      Patented Feb. 15, 1921.

Application filed September 11, 1919, Serial No. 323,045. Renewed July 20, 1920. Serial No. 397,754.

*To all whom it may concern:*

Be it known that I, CHARLES A. KRAUSS, a citizen of the United States, residing at Philadelphia, in the county of Philadelphia and State of Pennsylvania, have invented certain new and useful Improvements in Bails for Receptacles, of which the following is a specification.

This invention relates to bails, or handles for receptacles, such as pots, kettles, etc., and is intended to provide a handle which may be maintained in an upright position while the contents of the receptacle is being cooked, thereby minimizing possibility of the handle heating.

Another object of the invention is to provide a bail of substantially standard construction which will in no way encumber any receptacle with which it is associated and although designed to retain the bail in an upright position, nevertheless may pend by the side of the receptacle in the usual way if desired.

The above and other objects and advantages of this invention will be in part described, and in part understood from the following description of the present preferred embodiment, the same being illustrated in the accompanying drawings in which:—

Figure 1 is an end elevational view of a device constructed in accordance with my invention illustrating the application of the same on a receptacle, the latter being fragmentarily shown, Fig. 2 is a detail fragmentary side elevational view of the invention showing a part of the bail in section taken on the line 2—2 of Fig. 1, Fig. 3 is a detail fragmentary end elevational view of the bail, partly in section showing a slightly modified form, and Fig. 4 is a sectional view taken on the line 4—4 of Fig. 3 and looking in the direction of the arrow.

In the drawings in order to illustrate the application of my invention, a receptacle 1 is shown which may be of any suitable design, consisting of a pot, kettle or any other culinary vessel. The receptacle is equipped with the usual side ears 2, the bail openings 3 of which are elongated. It is to be understood that the receptacle and ears may be of any standard type, except that the bail openings in the ears must be slightly elongated.

My improved bail designated at 4 in the drawings, may be made of wire, the terminals of which are coiled as indicated at 5. The free end 6 of the coiled portion is turned outwardly as shown to advantage in Fig. 1 in order to facilitate introduction of the ear 3 in the coil or loop 5. The bail is offset directly below the throat of the loop portion 5 to provide an abutment 7 which seats on the wall provided by the opening in the ear 3. In this way, the bail is held in an upright position as shown by the full lines in Fig. 1.

If the bail 4 is made of a heavy wire or analogous metal, it is desirable that the throat of the loop 5 be made smaller than the width of the ear 3, as shown to advantage in dotted lines in Fig. 1, so that when the bail is in a perfectly upright position, as shown in full lines in Fig. 1, the body of the bail and the portion 6 of the terminal will frictionally embrace the opposite sides of the ear 2. In this way the bail will be held from displacement.

When a lighter wire, or some other material of less inherent resiliency is used for the bail, it is desirable to extend the free terminal of the loop 5 and convolute said extended part around the bail as indicated at 8 and shown to advantage in Figs. 3 and 4. In this way, casual displacement of the bail will be positively prevented.

In either form of the invention, it will be appreciated that the bail may be very expeditiously associated with or removed from the receptacle in an obvious manner. Moreover, when it is desired to retain the bail in an upright position, it is only necessary to seat the abutment 7 of the bail on the ears 2 in a manner illustrated to advantage in Figs. 1 and 3. Should it be desired to swing the bail to the side of the receptacle, this may be readily done by exerting pressure on the bail upwardly till the latter reaches the position shown in dotted lines in Fig. 1.

While the above comprehends the device of my invention in general form, it is nevertheless to be understood that slight changes in details of construction, proportion and arrangement of parts may be made within the scope of the appended claim.

I claim:—

A device as specified including a receptacle having laterally extended ears provided with elongated openings, a bail consisting of a strand of wire the ends of which are reversely folded to provide loop portions to receive said ears, the throat of said loop portions being smaller than the thickness of the ears to frictionally embrace the latter, said loops being offset subjacent the throat portion to provide a seat for retaining the bail in an upright position.

In testimony whereof I affix my signature in presence of two witnesses.

CHARLES A. KRAUSS.

Witnesses:
 WM. TRUEKS,
 CHRIS D. LANGENDORF.